(12) United States Patent
Krablin et al.

(10) Patent No.: US 7,743,370 B1
(45) Date of Patent: Jun. 22, 2010

(54) SYSTEM AND METHODS FOR DETERMINATION OF INDEPENDENCE OF SUB-GRAPHS IN A GRAPH-BASED INTERMEDIATE REPRESENTATION OF PROGRAM INSTRUCTIONS

(75) Inventors: G. Lawrence Krablin, Downingtown, PA (US); Stephen R. Bartels, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 1283 days.

(21) Appl. No.: 11/251,994

(22) Filed: Oct. 17, 2005

(51) Int. Cl.
*G06F 9/45* (2006.01)
(52) U.S. Cl. .................. 717/156; 717/155; 717/154; 717/151; 717/157
(58) Field of Classification Search .......... 717/140–161
See application file for complete search history.

(56) References Cited

U.S. PATENT DOCUMENTS

| | | | |
|---|---|---|---|
| 5,107,418 A * | 4/1992 | Cramer et al. | 717/155 |
| 5,448,737 A * | 9/1995 | Burke et al. | 717/146 |
| 5,493,675 A * | 2/1996 | Faiman et al. | 717/151 |
| 5,535,394 A * | 7/1996 | Burke et al. | 717/157 |
| 5,555,412 A * | 9/1996 | Besaw et al. | 717/144 |
| 5,649,203 A * | 7/1997 | Sites | 717/156 |
| 5,655,137 A * | 8/1997 | Kevorkian | 712/17 |
| 5,761,654 A * | 6/1998 | Tow | 707/2 |
| 5,926,639 A * | 7/1999 | Richardson | 717/156 |
| 6,026,485 A * | 2/2000 | O'Connor et al. | 712/226 |
| 6,075,940 A * | 6/2000 | Gosling | 717/126 |
| 6,131,189 A * | 10/2000 | Chow et al. | 717/141 |
| 6,173,444 B1 * | 1/2001 | Archambault | 717/159 |
| 6,662,354 B1 * | 12/2003 | Krablin et al. | 717/140 |
| 6,665,865 B1 * | 12/2003 | Ruf | 717/157 |
| 6,732,356 B1 * | 5/2004 | Chen | 717/156 |
| 6,966,027 B1 * | 11/2005 | Krasinski | 715/234 |
| 7,003,760 B1 * | 2/2006 | Das | 717/124 |
| 7,010,789 B1 * | 3/2006 | Kimelman et al. | 718/100 |

(Continued)

OTHER PUBLICATIONS

Author: Woo; Title: "Alias Analysis for Java with Reference-Set Representation in High-Performance Computing"; Date: Aug. 2001; URL: http://www.calstatela.edu/faculty/jwoo5/publications/thesis.pdf.*
Author: Gasner et al.; Title: "A technique for drawing directed graphs"; Date: 1993; URL: http://130.203.133.121:8080/viewdoc/summary?doi=10.1.1.3.8982.*

(Continued)

*Primary Examiner*—Lewis A Bullock, Jr.
*Assistant Examiner*—Joseph Kelly
(74) *Attorney, Agent, or Firm*—Richard J. Gregson; Robert P. Marley

(57) ABSTRACT

An intermediate representation of sequences of instructions for a stacked based computer is a code graph using a numbering method on the nodes of the graph, along with a set of relations among the nodes, to determine, in a single pass, the independence of each node or sub-graph represented by the node. The numbering is a post-order that directly, by numerical comparison defines the relevant hierarchical relationships among sub-graphs. The sub-graph of a particular node may have one or more alias nodes that refers to target nodes, a target node being a node representing an argument which is the result of a previous program instruction. For a subgraph to be considered independent, any aliases generated by nodes within the subgraph must themselves be contained in it, and conversely, any aliases in the subgraph must have been generated by nodes also within it.

10 Claims, 9 Drawing Sheets

U.S. PATENT DOCUMENTS

| | | | |
|---|---|---|---|
| 7,117,490 B2 * | 10/2006 | Harrison et al. | 717/156 |
| 7,496,894 B2 * | 2/2009 | Das | 717/124 |
| 2002/0010911 A1 * | 1/2002 | Cheng et al. | 717/4 |
| 2002/0169999 A1 * | 11/2002 | Bhansali et al. | 714/26 |
| 2004/0243982 A1 * | 12/2004 | Robison | 717/132 |
| 2005/0034111 A1 * | 2/2005 | Martin et al. | 717/141 |
| 2006/0112377 A1 * | 5/2006 | Nacul et al. | 717/140 |
| 2007/0288911 A1 * | 12/2007 | Martin et al. | 717/141 |

OTHER PUBLICATIONS

Author: Kazi et al.; Title: "Techniques for Obtaining High Performance in Java Programs"; Date: Sep. 2000; Volume: ACM Computing Surveys, vol. 32, No. 3; URL: http://portal.acm.org/citation.cfm?doid=367701.367714.*

Author: Whitfield et al.; Title: "An Approach to Ordering Optimizing Transformations"; Date: 1990; URL: http://portal.acm.org/citation.cfm?id=99179.*

* cited by examiner

Control Flow Graph Fragment

SYSTEM AND METHODS FOR DETERMINATION OF INDEPENDENCE OF SUB-GRAPHS IN A GRAPH-BASED INTERMEDIATE REPRESENTATION OF PROGRAM INSTRUCTIONS

CROSS REFERENCE TO RELATED PATENT

This patent application is related to U.S. Pat. No. 6,662,354 B1 and that patent is hereby incorporated by reference in its entirety.

FIELD OF INVENTION

The present invention relates to intermediate representations of sequences of computer instructions. More particularly, the present invention relates to analysis of intermediate representations of sequences of computer instructions for optimization of computer code.

BACKGROUND

In certain circumstances, it is useful to translate compiled machine code from a first state corresponding to a first instruction set to a second state corresponding to a second instruction set. As is known, such translating is preferable to the alternative: locating the source code from which the machine code in the first code state was derived; and writing and debugging a compiler to compile such located source code directly into the machine code in the second code state.

As is also known, such translating from the first code state to the second code state is performed by way of an appropriate re-compiler or translator on an appropriate processor with attached memory. In such translating from the first code state to the second code state, a control flow graph and an intermediate representation of the sequences of instructions is often helpful in the code optimization process and translating it from the first state to the second optimized state.

A directed graph provides a useful intermediate representation of sequences of instructions for a stack based computer. The representation is somewhat complicated by the fact that some instructions leave multiple results on the stack, which may then later be consumed by different successor instructions. The location on the expression stack and relationships between these results and the instructions that generated them are indicated by special graph nodes called "aliases."

When considering certain possible code rearrangements (i.e., optimizations), it is crucial to know that certain sub-graphs of the whole are effectively independent of the rest, that is, self-contained, allowing for reordering without altering the integrity of the whole. With respect to aliases, this means that any aliases generated by nodes within the sub-graph must themselves be contained in it, and conversely, that any aliases in the sub-graph must have been generated by nodes also within it.

In this regard, there is a need for an efficient method for analyzing a graph that is an intermediate representation of sequences of instructions for a stack based computer and identifying its self-contained sub-graphs.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods are provided for determining the independence of a sub-graph in a code graph, wherein the code graph is a graph-based representation of the sequences of computer program instructions. For several embodiments of the invention, determining the independence of a sub-graph in the code graph is carried out in part by visiting a plurality of nodes in the code graph in post-order fashion and determining for a current node being visited whether a sub-graph of the current node has an alias node that refers to a target node representing an argument which is the result of a previous program instruction. Then it is determined whether the target node is outside of the sub-graph of the current node and an indication is made that the sub-graph is not independent if the target node is outside the sub-graph of the current node.

Determining whether the target node is outside of the sub-graph of the current node may comprise determining a smallest post-order node number of all said target nodes of all alias nodes in the sub-graph of the current node and comparing the smallest post-order node number of all said target nodes to a smallest post-order node number overall in the sub-graph of the current node. Then an indication is made that the target node is outside the sub-graph of the current node if said smallest post-order node number of all said target nodes is not greater than or equal to the smallest post-order node number overall in the sub-graph of the current node. Other advantages and features of the invention are described below.

BRIEF DESCRIPTION OF THE DRAWINGS

System and methods for determination of independence of sub-graphs in a graph-based intermediate representation of program instructions are further described with reference to the accompanying drawings in which.

DETAILED DESCRIPTION

Figure 1:
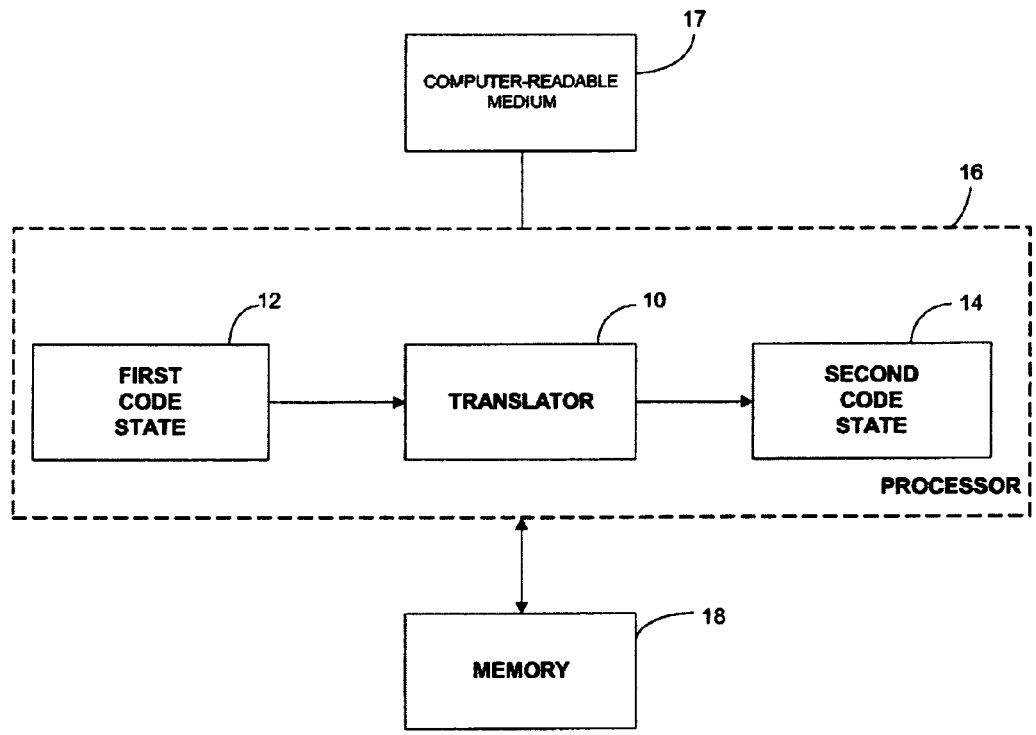
FIG. 1 is a block diagram showing a translator in accordance with the present invention operating on a processor and translating a program from a first state to a second state.

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

In the present disclosure, particular reference is made to the bytecode instruction set of the Java® virtual machine (JVM). The JVM bytecode instruction set is produced for use in connection with JVM, a virtual computer, typically implemented in software on top of a hardware platform and operating system, that runs compiled programs written in the Java® programming language developed and maintained primarily by Sun Microsystems, Inc. of Palo Alto, Calif. However, the present invention is not limited to the JVM bytecode instruction set, and may in fact be employed with any appropriate instruction set (with appropriate modifications) without departing from the spirit and scope of the present invention.

In the present invention, and referring now to FIG. 1, a re-compiler or translator 10 translates compiled machine code from a first state 12 corresponding to a first instruction set to a second state 14 corresponding to a second instruction set. Typically, the translator is operated on a processor 16 with attached memory 18, and the translator 10 is constructed by the processor 16 from a computer-readable medium 17 having computer-executable instructions. Any appropriate processor 16 and memory 18 may be employed without departing from the spirit and scope of the present invention.

Figure 2:
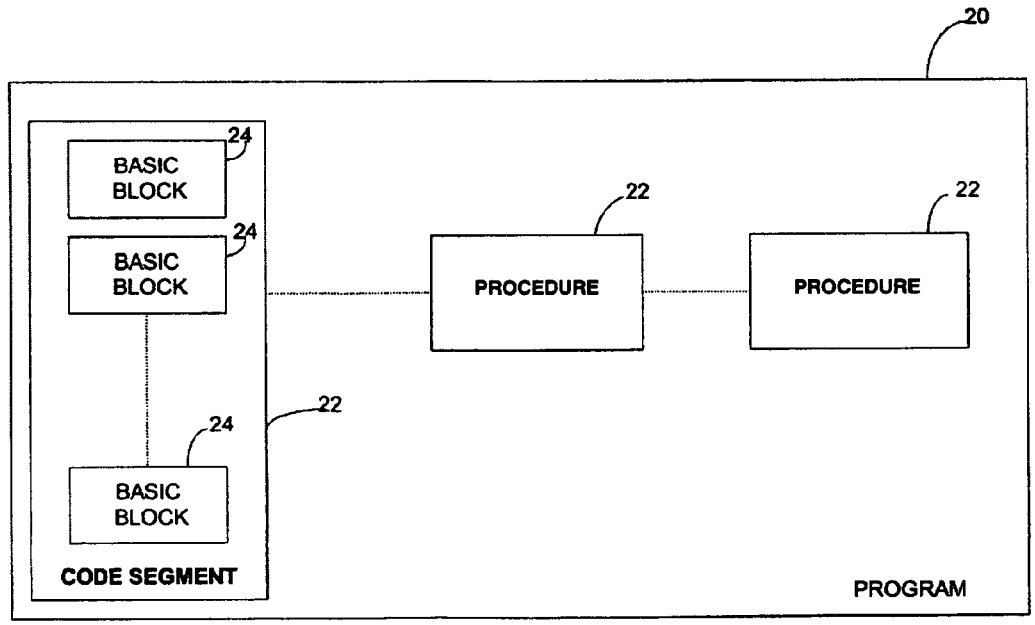
FIG. 2 is a block diagram showing the structure of a typical program as it may appear in the first state of FIG. 1.

Referring now to FIG. 2, a program 20 consists of a set of procedures 22. Descriptors for the procedures are contained in a procedure dictionary. In the present invention, code analysis is performed by the translator 10 for one procedure 22 at a time, although the generalization to a complete program 20 is straightforward.

A particular procedure 22 may generally be divided into a set of basic blocks 24, where each basic block 24 is a sequence that is entered only at its beginning, be it by a branch, a procedure call, or falling through from a preceding block, and that is exited only through the last instruction in such basic block 24. Thus, any branch must necessarily be the last instruction in a basic block 24. Often, but not always, a basic block 24 is defined as a maximal sequence, but this is not necessary for the purpose of the present invention.

Figure 3:
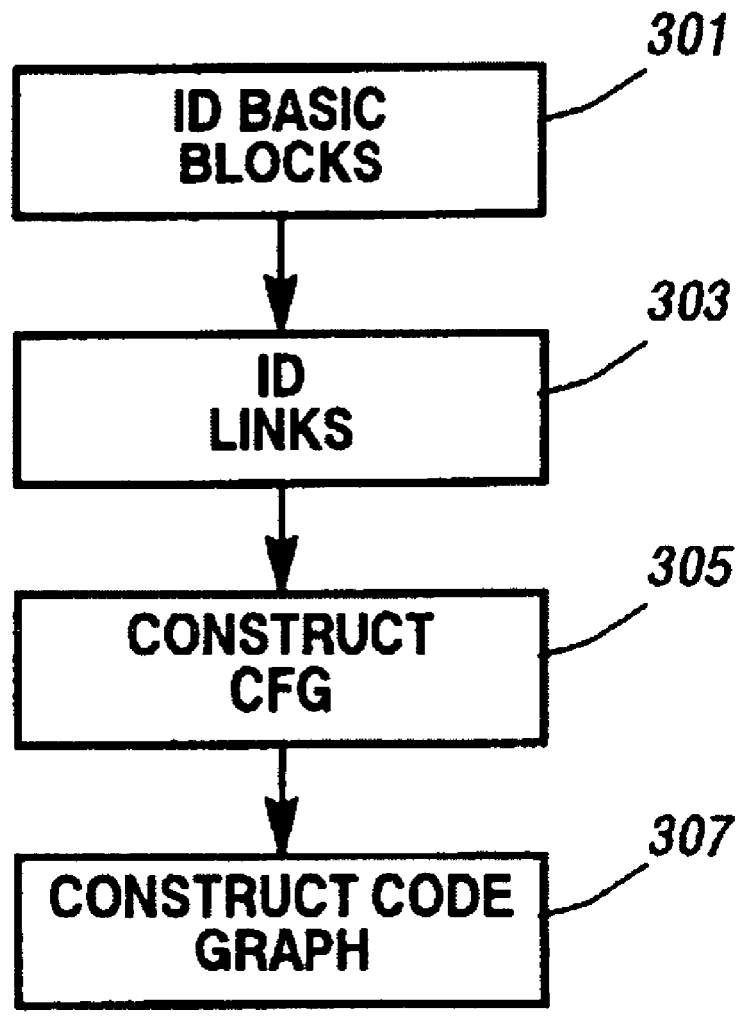
FIG. 3 is a flow diagram showing the preliminary steps performed by the translator of FIG. 1.

Referring now to FIG. 3, the translator analyzes the program 20 by conventional means to determine the basic blocks 301, identify links 303 and construct 305 the control flow graph (CFG) relating the blocks to each other. The CFG then provides the basis for construction 307 of the code graph.

Figure 4:
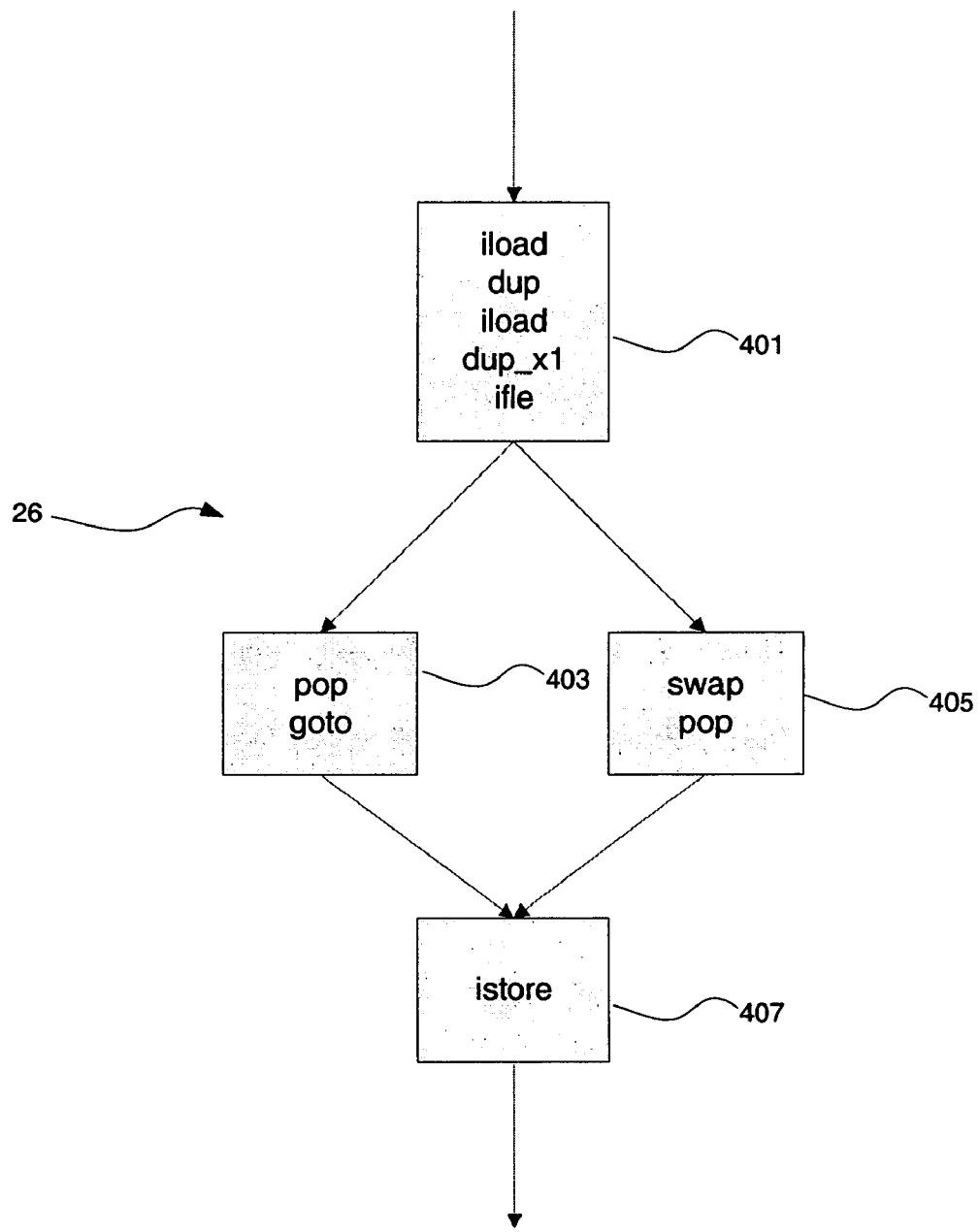
FIG. 4 is a diagram showing a control flow graph (CFG) fragment constructed by the translator of FIG. 1 for particular basic blocks of code corresponding to a Java® virtual machine (JVM) bytecode procedure.

Referring to FIG. 4, shown as an example is a diagram of a CFG fragment 26 constructed by the translator of FIG. 1 for a particular JVM bytecode procedure. As can be seen, the procedure is entered at block 401, which branches to either block 403 or block 405. Block 403 and block 405 both all lead to Block 407. Once the translator 10 has fully parsed the program 20 to establish the basic blocks 401, 403, 405, 407 and the CFG 26, the translator 10 then constructs 307 a code graph or representation of the instructions in each block 24 (as seen in FIGS. 6-9 using the JVM bytecode instruction set). Alternatively, since it may be the case that not all blocks 24 need be code-graphed, the translator 10 may construct a code graph for a block 24 on an as-needed basis.

Referring now generally to FIGS. 6-9, as with the CFG 26, the code graphs are shown in FIGS. 6-9 in the form of graphs, although it should be understood that the translator 10 may maintain the code graphs in a file or table format or the like. Preferably, each code graph is a rooted directed acyclic graph having interconnected nodes, where such nodes fall into three categories: instruction, inner, and special. All nodes carry some basic information, such as how many stack inputs are required by the node and how many stack items are left by the node.

Instruction nodes are leaf nodes having no departing edges. Each represents an instruction in the original stream of instructions in the block 24. Where an instruction consumes one or more arguments from the stack, it is linked to such arguments by an inner "apply" node. The apply node has two outgoing edges, one (on the left) to the instruction being applied, and the other (on the right) to the argument(s) being applied to. Most instructions leave zero or one result items on the stack. The apply node, then, represents the application of the instruction to its arguments. Where the result of such an application is then an argument to a following instruction, the apply node may be referred to by the right edge of the apply node for the following instruction. No apply node is needed for instructions which take no arguments from the top of stack. If apply nodes were to be used for "nullary" instructions, one would have to allow the appearance of "empty" or "null" nodes in the graph. There is a concept of an empty node, but it does not appear as part of a larger graph, being used solely as a placeholder for an empty or uninitialized graph.

Many JVM bytecode instructions take more than one argument from the stack. These arguments are represented in the graph using a "stack" inner node. A stack node also has two outgoing edges. The left indicates the most recent (topmost) item added to the stack, and the right indicates the remaining items. The left sub-tree of a stack node is never itself a stack sub-tree, while the right sub-tree often is. The term "item on the stack" is used loosely here, as a either or both of the left or right sub-trees reached from a stack node may represent an expression that leaves nothing on the stack. As may be appreciated from viewing FIGS. 6-9, in any code graph, chronological action generally occurs from bottom to top in a lower right to upper left traversal of the spanning tree (i.e., the tree without any alias nodes and links).

It is often the case that a code graph will contain a special "ghost" node that is used as a representation of an item left on the stack by predecessor blocks. These items are known when beginning to process the block at hand. A ghost node is a leaf and always indicates a single item on the stack. Each node in a graph contains a count of the number of ghost nodes in the sub-tree it heads.

Some JVM bytecode instructions return multiple items on the stack. In order to allow these results to be individually represented as input arguments to later instructions, the "alias" inner node acts as a placeholder and indirect reference to one result item of such an instruction. It is an interior node, edged to from a stack node or apply node, and has a single outgoing edge leading either to the application of the instruction producing the item to which it refers, or (see below) directly to one of the arguments of such application. An alias node always points to another node in the same code graph and never points to another alias node or a stack node. Such alias node also carries an index indicating which of the results of that instruction is being referred to.

An alias-producing apply node is itself marked as returning zero items to the stack, with an appropriate number alias nodes stacked above to represent all the results. In addition, it is sometimes convenient to use an alias to represent the result of an application that returns a single item on the stack, again marking the apply itself as returning zero items. This is convenient for situations where the result happens to be a copy of one of the input arguments. In practice, an apply node will never appear with a result count greater than one. Stack nodes will, however, as the output count associated with a stack node is the total for the sub-tree it heads.

Instruction sets such as JVM bytecode include a set of instructions which permute items on top of the stack. Examples of such instructions in the JVM bytecode instruction set include dup: duplicate top of stack and swap: exchange two top stack items. The alias nodes for these instructions point directly to the original item, rather than to the instruction node. A more detailed description of how code graphs may be created is provided in related U.S. Pat. No. 6,662,354, which is hereby incorporated by reference in its entirety.

Figure 5:
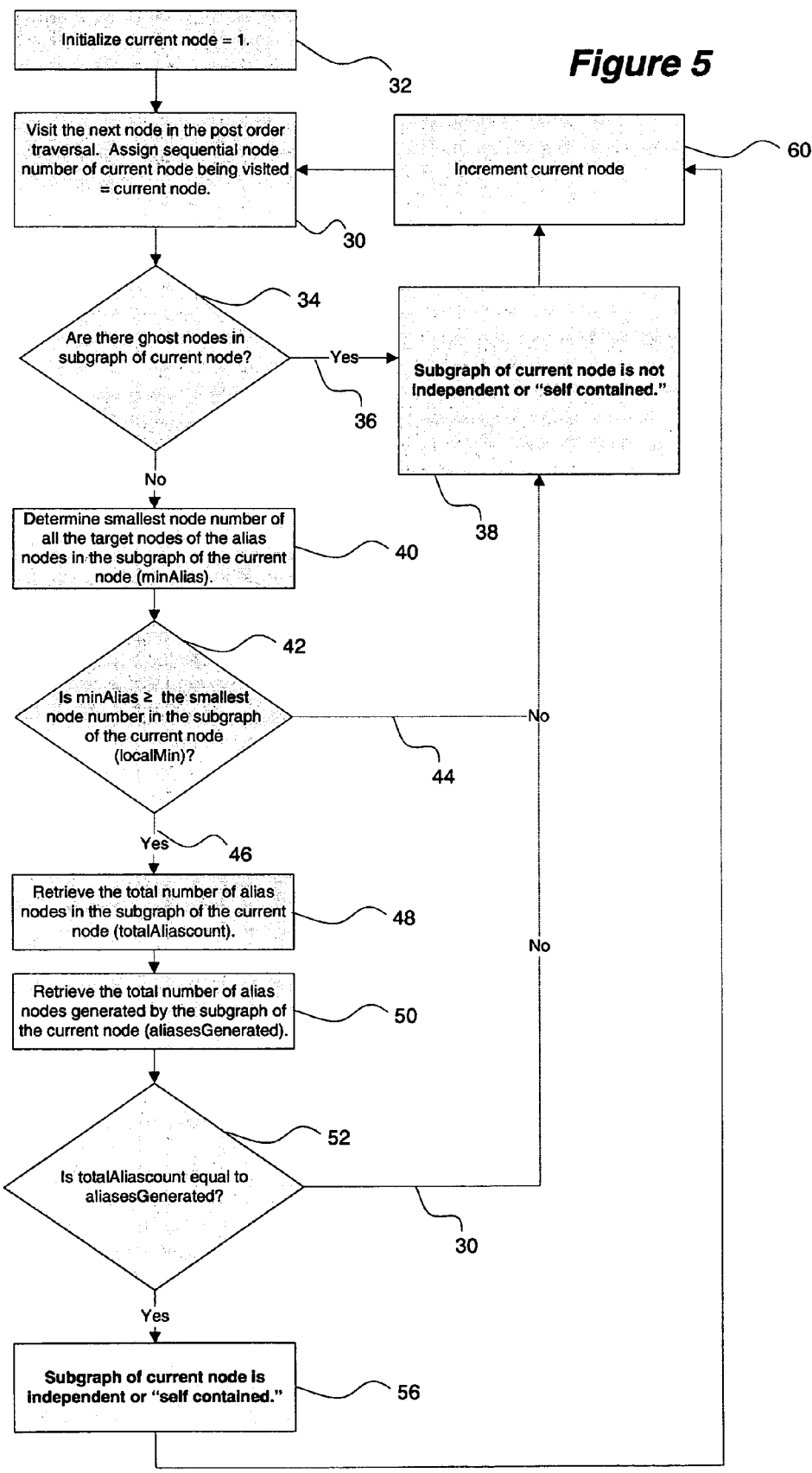
FIG. 5 is a flow chart showing a process for determining the independence of sub-graphs contained within code graphs such as those in FIG. 5 and FIGS. 6-9 according to the present invention.

Referring next to FIG. 5, shown is a flow chart illustrating a process for determining the independence of sub-graphs contained within code graphs such as those in FIGS. 6-9 according to the present invention. When considering certain possible code rearrangements (i.e., optimizations), it is crucial to know that a certain sub-graphs of the whole are effectively independent of the rest, that is, self-contained, allowing for reordering without altering the integrity of the whole. With respect to aliases, this means that any aliases generated by nodes within the sub-graph must themselves be contained in it, and conversely, that any aliases in the sub-graph must have been generated by nodes also within it.

The process illustrated in FIG. 5 uses a numbering method on the nodes of the graph, along with a set of relations among the nodes, as described above, to determine, in a single pass, the independence of each node or sub-graph represented by the node. The numbering is a postorder that directly, by numerical comparison defines the relevant hierarchical relationships among sub-graphs.

As each node in the code graph is visited (i.e., processed) in post-order fashion 30, it is assigned a sequential node number (starting from 1, for example, and ending at n total nodes in the code graph). A post order traversal, also known as a postfix traversal, is a depth-first tree traversal that processes all nodes of a tree by recursively processing all subtrees, then finally processing the root. In the example implementation provided herein, the root's right subtree is traversed first and then the root's left subtree is traversed before visiting the root.

The numbering of nodes in post-order fashion is done in conjunction with the process below as each node is visited to determine whether the sub-graph of the node is independent. A current node number is initialized to 132, and then as each node is visited in the post order traversal to determine whether the sub-graph of the node is independent, it is assigned sequential node number 30. Alternatively, the numbering of nodes in post-order fashion may instead be done in an initial pass before the determination of whether the sub-graph of a current node is independent. Information such as the type of node, or regarding the sub-graph of the node, etc. are stored in fields associated with each node when the code graph is created as described above and may be used and tracked as the code graph is created or traversed. Since post-order traversal results in all the nodes of the sub-graph of the current node being processed before the current node, information regarding the entire sub-graph of the current node can be tracked and stored as the tree is traversed in post-order fashion.

A first test to determine whether the sub-graph of the current node is independent is whether there are ghost nodes in the sub-graph of the current node 34. Ghost nodes, as described above, occur in the case where a basic block contains an instruction some or all of whose arguments are supplied from (i.e., placed on the stack by) a different basic block. The special "ghost" node is used as a placeholder in the graph for the missing argument. If there are ghost nodes in the sub-graph of the current node, this indicates the sub-graph of the current node is not independent 38 because the sub-graph of the current code block represented by the code graph is dependent on another block that preceded it in the computation.

Next, a determination is made 40 as to what is the smallest node number of all the target nodes of the alias nodes in the sub-graph of the current node. Designate this number, for example, the minAlias for each node. This is compared 42 to the smallest node number overall in the sub-graph of the current node, called the localMin for each node, for example. If the smallest node number of all the target nodes of the alias nodes in the sub-graph of the current node (minAlias) is not greater than or equal to the smallest node number overall in the sub-graph of the current node (localMin) 42, then this indicates that the sub-graph has imported aliases from some larger previous graph. Thus, the sub-graph of the current node is not independent 38.

If the smallest node number of all the target nodes of the alias nodes in the sub-graph of the current node (minAlias) is greater than or equal to the smallest node number overall in the sub-graph of the current node (localMin) 46, then another test to determine whether the sub-graph of the current node is performed 52. First, the total number of alias nodes in the sub-graph of the current node (totalAliascount) is retrieved 48. Then, the total number of alias nodes generated by the sub-graph of the current node (aliasesGenerated) is retrieved 50. The values for totalAliascount and aliasesGenerated for each node are preferably calculated during creation of the code graph. If the total number of alias nodes in the sub-graph of the current node (totalAliascount) is equal to the total number of alias nodes generated by the sub-graph of the current node (aliasesGenerated) 54, it indicates the sub-graph of the current node is not exporting any aliases that are unsatisfied, (i.e., haven't been used yet). Thus, since the previous tests 34, 42 were passed as well, the sub-graph of the current node is independent 56. Otherwise, if the total number of alias nodes in the sub-graph of the current node (totalAliascount) is not equal to the total number of alias nodes generated by the sub-graph of the current node (aliasesGenerated) 58, it indicates the sub-graph of the current node is not independent 38. Also, the tests 34 42 52 for determining whether the sub-graph of the current node is independent may be performed solely or in a different order than that described above without departing from the spirit and scope of the present invention. Once it is determined whether the sub-graph of the current node is independent or not, the current node is incremented 60 and the process above is repeated for all the nodes in the code graph as they are visited in the post-order traversal.

The process above may be implemented in software or hardware in a number of ways to achieve the same result. For example, below is a procedure written in the programming language Pascal that implements the process above for assigning node numbers and examining sub-graphs in a recursive fashion:

```
procedure cg_postOrder (g:cg_inx;
    var current, localMin, minAlias:integer);
begin
    with cg[g] do begin
        case cg [g].kind of
            STACK_k,
            APPLY_k:
            begin
                cg_postOrder (right, current, localMin, minAlias);
                cg_postOrder (left, current, localMin, minAlias);
            end;
            ALIAS_k:
            begin
                assert (cg [target].myPostOrderNo<current);
                minAlias:=min (minAlias, cg [target].myPostOrderno);
                localMin:=min (localMin, current);
            end;
            otherwise
                localMin:=min (localMin, current);
        end {case};
        myPostOrderNo:=current;
        havePostOrder:=true;
        current:=current+1;
        selfContained:=(ghostCount=0) cand
            (minAlias>=localMin) cand
            (totalAliasCount=aliasesGenerated);
    end {with};
end {cg_postOrder};
procedure cg_checkSelfContained (g:cg_inx);
var current, localMin, minAlias:integer;
begin
    if not cg [g].havePostOrder then begin
        current:=1;
        localMin:=nullPostOrder;
        minAlias:=nullPostOrder;
        cg_postOrder (g, current, localMin, minAlias);
    end;
end {cg_postOrder};
```

The variable nullPostOrder is essentially positive infinity and the variables totalAliasCount, aliasesGenerated, myPostOrderNo, havePostOrder and kind are fields within the each graph node. The fields right and left are fields within stack and apply nodes, and target is a field within an alias node.

Figure 6:
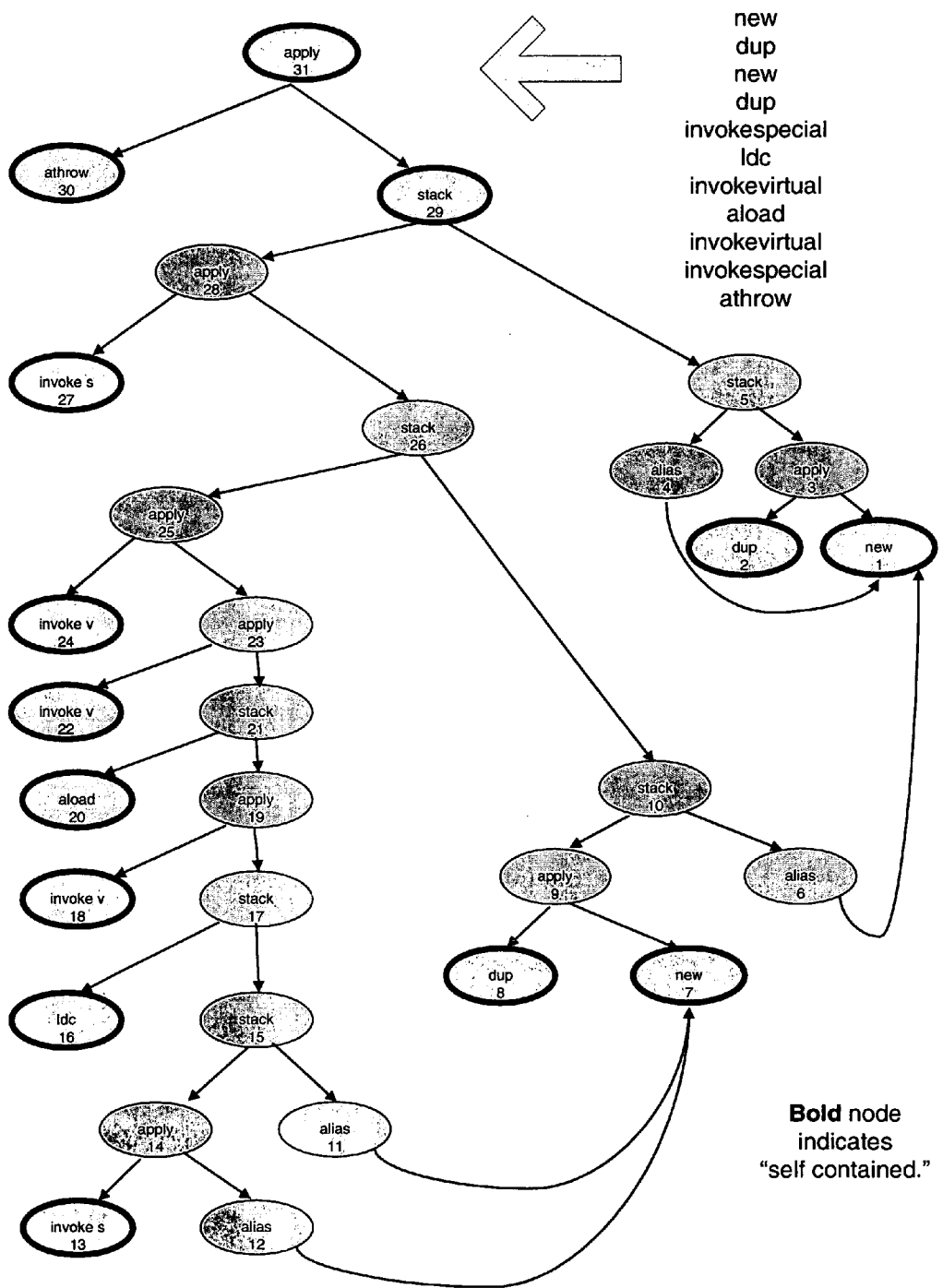
FIG. 6 is diagram showing an instance of a code graph constructed by the translator of FIG. 1 for particular basic blocks of code corresponding to the Java® virtual machine (JVM) bytecode instructions shown in FIG. 6 according to the present invention.

Referring next to FIG. 6, shown is diagram illustrating an instance of a code graph constructed by the translator of FIG. 1 for particular basic blocks of code corresponding to the Java® virtual machine (JVM) bytecode instructions shown in FIG. 6 according to the present invention. For FIG. 6, the Java source statement would look something like:

throw new MalformedURLException ((new StringBuffer ("Invalid URI:"+param1)).toString ( ));

The table below shows each node name with the node's post-order number to the right of the node name. If the node is a JVM bytecode instruction, that is the node's name. Also shown is the operation name description (op name) associated with each bytecode instruction node, the node number of the alias reference if the node happens to be an alias (alias reference), the number of aliases generated by the sub-graph of the node (aliases generated), the total number of aliases in the sub-graph of the node (aliasCount), the total number of ghost nodes in the sub-graph headed by the node (ghostCount), the smallest node number overall in the sub-graph of the node (localMin), and the smallest node number of all the target nodes of the alias nodes in the sub-graph headed by the node (minAlias). Finally, the determination of whether the sub-graph of the node is independent (i.e., self-contained) is shown in the selfContained column. The "- - -" designation in the minAlias column represents positive infinity since that particular node does not have any aliases within the sub-graph of that node.

| | | op name | alias reference | aliases generated | aliasCount | ghostCount | localMin | minAlias | selfContained |
|---|---|---|---|---|---|---|---|---|---|
| 1 | new | create new object | | 0 | 0 | 0 | 1 | — | TRUE |
| 2 | dup | duplicate top stack value | | 0 | 0 | 0 | 2 | — | TRUE |
| 3 | apply | | | 2 | 0 | 0 | 1 | — | FALSE |
| 4 | alias | | 1 | 0 | 1 | 0 | 4 | 1 | FALSE |
| 5 | stack | | | 2 | 1 | 0 | 1 | 1 | FALSE |
| 6 | alias | | 1 | 0 | 1 | 0 | 6 | 1 | FALSE |
| 7 | new | create new object | | 0 | 0 | 0 | 7 | — | TRUE |
| 8 | dup | duplicate top stack value | | 0 | 0 | 0 | 8 | — | TRUE |
| 9 | apply | | | 2 | 0 | 0 | 7 | — | FALSE |
| 10 | stack | | | 2 | 1 | 0 | 6 | 1 | FALSE |
| 11 | alias | | 7 | 0 | 1 | 0 | 11 | 7 | FALSE |
| 12 | alias | | 7 | 0 | 1 | 0 | 12 | 7 | FALSE |
| 13 | invokespecial | invoke instance method | | 0 | 0 | 0 | 13 | — | TRUE |
| 14 | apply | | | 0 | 1 | 0 | 12 | 7 | FALSE |
| 15 | stack | | | 0 | 2 | 0 | 11 | 7 | FALSE |
| 16 | ldc | push constant | | 0 | 0 | 0 | 16 | — | TRUE |
| 17 | stack | | | 0 | 2 | 0 | 11 | 7 | FALSE |
| 18 | invokevirtual | invoke virtual method | | 0 | 0 | 0 | 18 | — | TRUE |
| 19 | apply | | | 0 | 2 | 0 | 11 | 7 | FALSE |

| | op name | alias reference | aliases generated | aliasCount | ghostCount | localMin | minAlias | selfContained |
|---|---|---|---|---|---|---|---|---|
| 20 aload | load object reference | | 0 | 0 | 0 | 20 | — | TRUE |
| 21 stack | | | 0 | 2 | 0 | 11 | 7 | FALSE |
| 22 invokevirtual | invoke virtual method | | 0 | 0 | 0 | 22 | — | TRUE |
| 23 apply | | | 0 | 2 | 0 | 11 | 7 | FALSE |
| 24 invokevirtual | invoke virtual method | | 0 | 0 | 0 | 24 | — | TRUE |
| 25 apply | | | 0 | 2 | 0 | 11 | 7 | FALSE |
| 26 stack | | | 2 | 3 | 0 | 6 | 1 | FALSE |
| 27 invokespecial | invoke instance method | | 0 | 0 | 0 | 27 | — | TRUE |
| 28 apply | | | 2 | 3 | 0 | 6 | 1 | FALSE |
| 29 stack | | | 4 | 4 | 0 | 1 | 1 | TRUE |
| 30 athrow | throw exception | | 0 | 0 | 0 | 30 | — | TRUE |
| 31 apply | | | 4 | 4 | 0 | 1 | 1 | TRUE |

For example, note that the sub-graph of node 10 is not independent (i.e., not self-contained). One of the reasons that the sub-graph of node 10 is not independent is due to the fact that it has an alias node (node 6) in the sub-graph of node 10 whose target node (node 1) is in a different sub-graph. This is determined by comparing minAlias of node 10, which has a value of 1 to localMin, which has a value of 6. Since minAlias is not $\geq$ localMin for node 10, the sub-graph of node 10 is not self-contained.

nodes in the sub-graph of the node (ghostCount), the smallest node number overall in the sub-graph of the node (localMin), and the smallest node number of all the target nodes of the alias nodes in the sub-graph of the node (minAlias). Finally, the determination of whether the sungraph of the node is independent (i.e., self-contained) is shown in the selfContained column. The "- - -" designation in the minAlias column represents positive infinity since that particular node does not have any aliases within the sub-graph of that node.

| | op name | alias reference | aliases generated | aliasCount | ghostCount | localMin | minAlias | selfContained |
|---|---|---|---|---|---|---|---|---|
| 1 iload | load integer | | 0 | 0 | 0 | 1 | — | TRUE |
| 2 dup | duplicate top stack value | | 0 | 0 | 0 | 2 | — | TRUE |
| 3 apply | | | 2 | 0 | 0 | 1 | — | FALSE |
| 4 alias | | 1 | 0 | 1 | 0 | 4 | 1 | FALSE |
| 5 stack | | | 2 | 1 | 0 | 1 | 1 | FALSE |
| 6 alias | | 1 | 0 | 1 | 0 | 6 | 1 | FALSE |
| 7 ineg | complement top value | | 0 | 0 | 0 | 7 | — | TRUE |
| 8 apply | | | 0 | 1 | 0 | 8 | 1 | FALSE |
| 9 stack | | | 2 | 2 | 0 | 1 | 1 | TRUE |
| 10 imul | multiply top two values | | 0 | 0 | 0 | 10 | — | TRUE |
| 11 apply | | | 2 | 2 | 0 | 1 | 1 | TRUE |
| 12 iload | load integer | | 0 | 0 | 0 | 12 | — | TRUE |
| 13 stack | | | 2 | 2 | 0 | 1 | 1 | TRUE |
| 14 iadd | add top two values | | 0 | 0 | 0 | 14 | — | TRUE |
| 15 apply | | | 2 | 2 | 0 | 1 | 1 | TRUE |
| 16 istore | store integer | | 0 | 0 | 0 | 16 | — | TRUE |
| 17 apply | | | 2 | 2 | 0 | 1 | 1 | TRUE |

Figure 7:
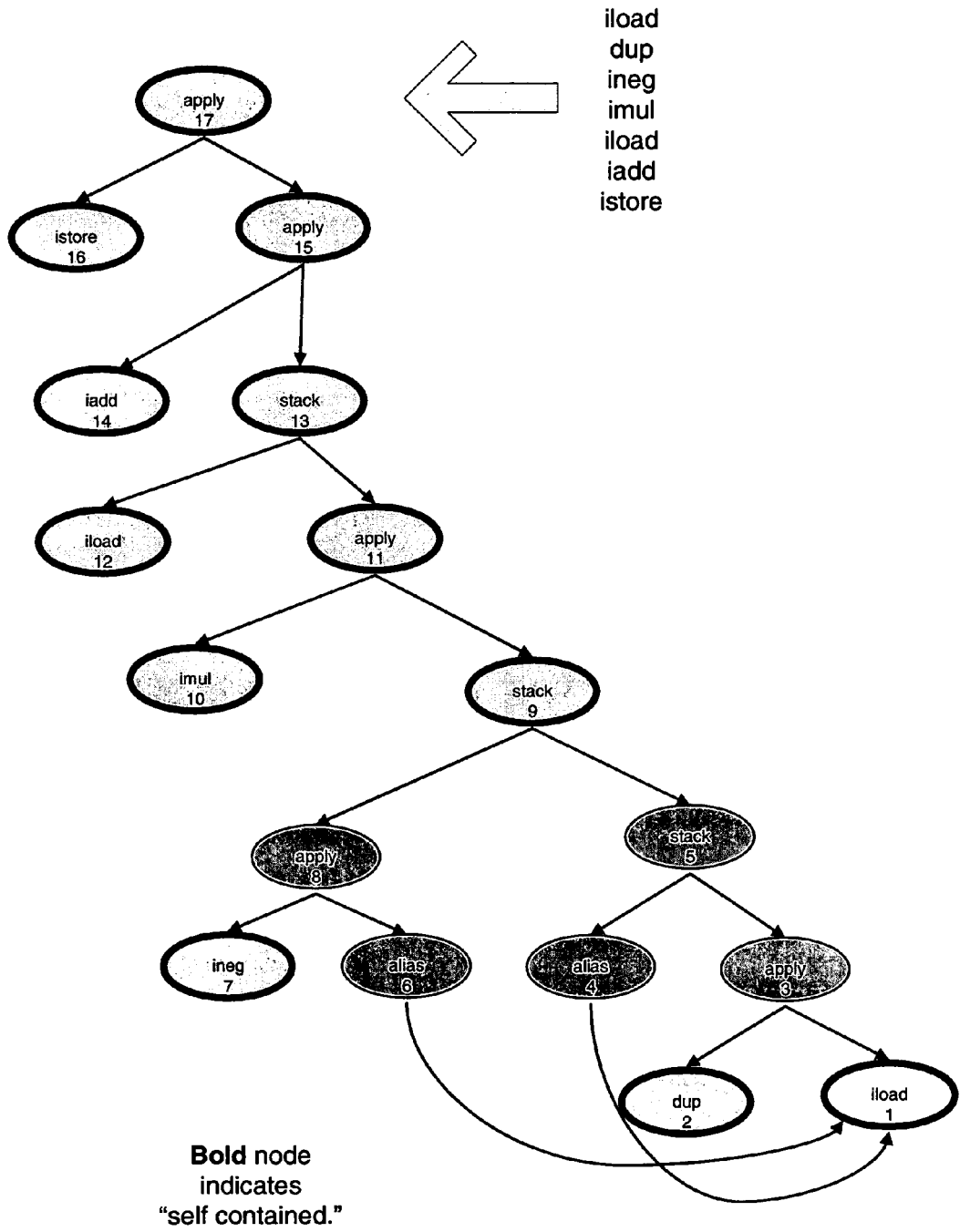
FIG. 7 is diagram showing an instance of a code graph constructed by the translator of FIG. 1 for particular basic blocks of code corresponding to the Java® virtual machine (JVM) bytecode instructions shown in FIG. 7 according to the present invention.

Referring next to FIG. 7, shown is diagram illustrating an instance of a code graph constructed by the translator of FIG. 1 for particular basic blocks of code corresponding to the Java® virtual machine (JVM) bytecode instructions shown in FIG. 7 according to the present invention. For FIG. 7, the corresponding source code might be (note that the compiler has "optimized" the consecutive loads of 'a' into a load:dup):

$c=a*-a+b;$

The table below shows each node name with the node's post-order number to the right of the node name. If the node is a JVM bytecode instruction, that is the node's name. Also shown is the operation name description (op name) associated with each bytecode instruction node, the node number of the alias reference if the node happens to be an alias (alias reference), the aliases generated by the sub-graph of the node (aliases generated), the total number of aliases in the sub-graph of the node (aliasCount), the total number of ghost Note in the above example and corresponding FIG. 7, the sub-graph of node 9 is self-contained as it does not have any ghosts within it, has not imported aliases from some larger previous graph, and did not export any aliases that are unsatisfied, (i.e., haven't been used yet). This is reflected in the fact that for node 9, ghostCount equals zero, aliases generated equals aliasCount, and minAlias$\geq$localMin.

Figure 8:
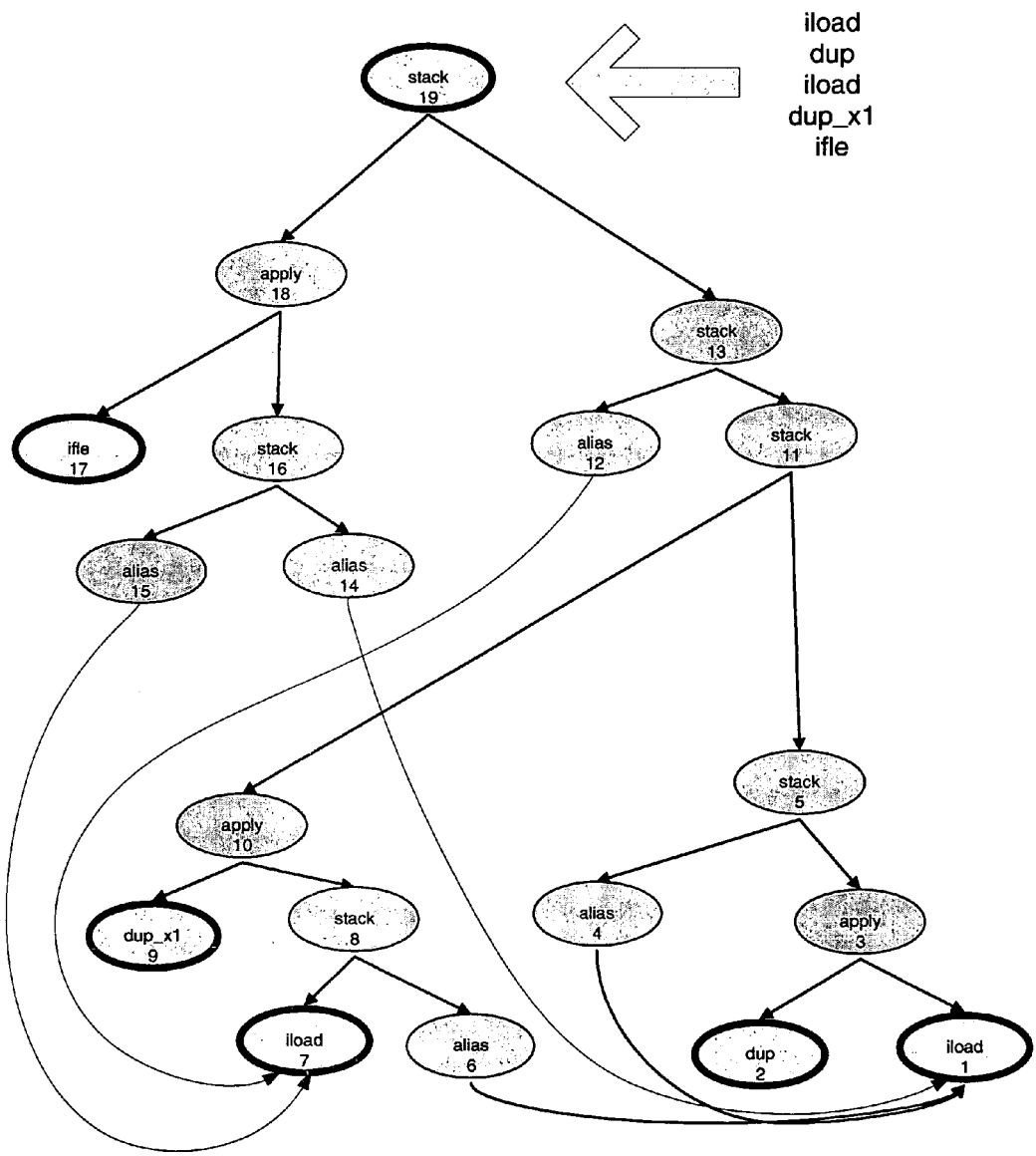
FIG. 8 is diagram showing an instance of a code graph constructed by the translator of FIG. 1 for particular basic blocks of code corresponding to the Java® virtual machine (JVM) bytecode instructions shown in FIG. 8 according to the present invention.

Referring next to FIG. 8, shown is diagram illustrating an instance of a code graph constructed by the translator of FIG. 1 for particular basic blocks of code corresponding to the Java® virtual machine (JVM) bytecode instructions shown in FIG. 8 according to the present invention. The corresponding source code for FIG. 8 and FIG. 9 (introduced below) are the first and third (second to last) basic blocks of a source code statement that might look like that below (again, the compiler may have done some optimization):

$c=a<=b?a:b;$

The second basic block would discard (pop) the top item and branch to the fourth. The fourth would simply store the top of stack item into c. The third basic block (corresponding to graph 4) would just fall through to the fourth. The entire JVM bytecode instruction sequence would be:

iload a
    dup
    iload b
    dup_x1
    ifle<label 1>
    pop
    goto <label 2>
    label 1:
    swap
    pop
    label 2:
    istore c Regarding the code graph of FIG. 8, the table below shows each node name with the node's post-order number to the right of the node name. If the node is a JVM bytecode instruction, that is the node's name. Also shown is the operation name description (op name) associated with each bytecode instruction node, the node number of the alias reference if the node happens to be an alias (alias reference), the aliases generated by the sub-graph of the node (aliases generated), the total number of aliases in the sub-graph of the node (aliasCount), the total number of ghost nodes in the sub-graph of the node (ghostCount), the smallest node number overall in the sub-graph of the node (localMin), and the smallest node number of all the target nodes of the alias nodes in the sub-graph of the node (minAlias). Finally, the determination of whether the sungraph of the node is independent (i.e., self-contained) is shown in the selfContained column. The "- - -" designation in the minAlias column represents positive infinity since that particular node does not have any aliases within the sub-graph of that node.

Note in the above example and corresponding FIG. 8, node 1 is self-contained although it is the target of alias nodes outside the sub-graph of node 1 (node 1 is itself the sub-graph), it is self-contained as it is not an alias node itself.

Figure 9:
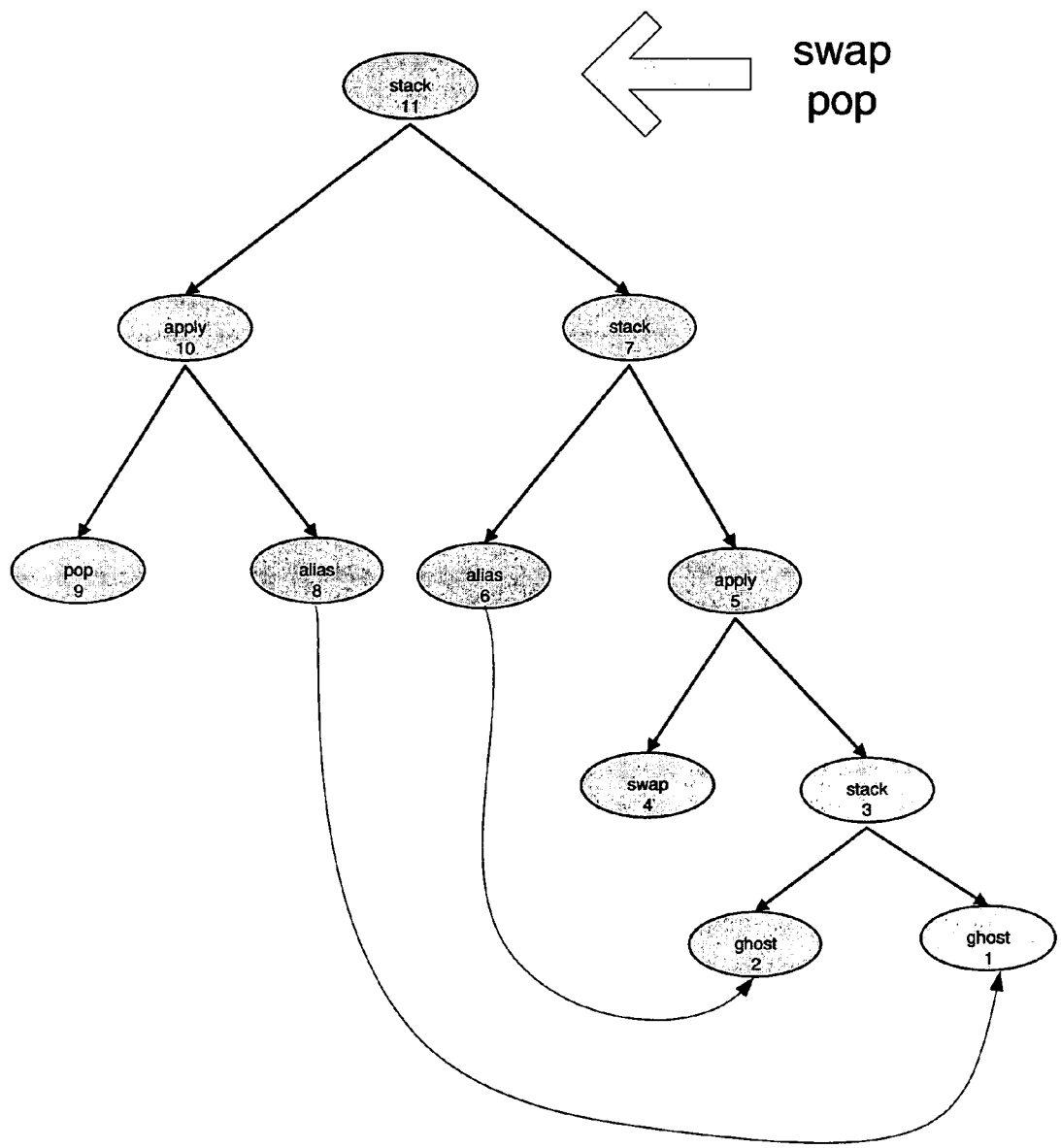
FIG. 9 is diagram showing an instance of a code graph constructed by the translator of FIG. 1 for particular basic blocks of code corresponding to the Java® virtual machine (JVM) bytecode instructions shown in FIG. 9 according to the present invention.

Referring next to FIG. 9, shown is diagram illustrating an instance of a code graph constructed by the translator of FIG. 1 for particular basic blocks of code corresponding to the Java® virtual machine (JVM) bytecode instructions shown in FIG. 9 according to the present invention.

The table below shows each node name with the node's post-order number to the right of the node name. If the node is a JVM bytecode instruction, that is the node's name. Also shown is the operation name description (op name) associated with each bytecode instruction node, the node number of the alias reference if the node happens to be an alias (alias reference), the aliases generated by the sub-graph of the node (aliases generated), the total number of aliases in the sub-graph of the node (aliasCount), the total number of ghost nodes in the sub-graph of the node (ghostCount), the smallest node number overall in the sub-graph of the node (localMin), and the smallest node number of all the target nodes of the alias nodes in the sub-graph of the node (minAlias). Finally, the determination of whether the sungraph of the node is independent (i.e., self-contained) is shown in the selfContained column. The "- - -" designation in the minAlias column represents positive infinity since that particular node does not have any aliases within the sub-graph of that node.

|  | op name | alias reference | aliases generated | aliasCount | ghostCount | localMin | minAlias | selfContained |
|---|---|---|---|---|---|---|---|---|
| 1 iload | load integer |  | 0 | 0 | 0 | 1 | — | TRUE |
| 2 dup | duplicate top stack value |  | 0 | 0 | 0 | 2 | — | TRUE |
| 3 apply |  |  | 2 | 0 | 0 | 1 | — | FALSE |
| 4 alias |  | 1 | 0 | 1 | 0 | 4 | 1 | FALSE |
| 5 stack |  |  | 2 | 1 | 0 | 1 | 1 | FALSE |
| 6 alias |  | 1 | 0 | 1 | 0 | 6 | 1 | FALSE |
| 7 iload | load integer |  | 0 | 0 | 0 | 7 | — | TRUE |
| 8 stack |  |  | 0 | 1 | 0 | 6 | 1 | FALSE |
| 9 dup_x | copy top value under next |  | 0 | 0 | 0 | 9 | — | TRUE |
| 10 apply |  |  | 3 | 1 | 0 | 6 | 1 | FALSE |
| 11 stack |  |  | 5 | 2 | 0 | 1 | 1 | FALSE |
| 12 alias |  | 7 | 0 | 1 | 0 | 12 | 7 | FALSE |
| 13 stack |  |  | 5 | 3 | 0 | 1 | 1 | FALSE |
| 14 alias |  | 1 | 0 | 1 | 0 | 14 | 1 | FALSE |
| 15 alias |  | 7 | 0 | 1 | 0 | 15 | 7 | FALSE |
| 16 stack |  |  | 0 | 2 | 0 | 14 | 1 | FALSE |
| 17 ifle | branch if less or equal |  | 0 | 0 | 0 | 17 | — | TRUE |
| 18 apply |  |  | 0 | 2 | 0 | 14 | 1 | FALSE |
| 19 stack |  |  | 5 | 5 | 0 | 1 | 1 | TRUE |

|  | op name | alias reference | aliases generated | aliasCount | ghostCount | localMin | minAlias | selfContained |
|---|---|---|---|---|---|---|---|---|
| 1 | ghost | | | 0 | 0 | 1 | 1 | — | FALSE |
| 2 | ghost | | | 0 | 0 | 1 | 2 | — | FALSE |
| 3 | stack | | | 0 | 0 | 2 | 1 | — | FALSE |
| 4 | swap | exchange two top values | | 0 | 0 | 0 | 4 | — | FALSE |
| 5 | apply | | | 2 | 0 | 2 | 1 | — | FALSE |
| 6 | alias | | 2 | 0 | 1 | 0 | 6 | 2 | FALSE |
| 7 | stack | | | 2 | 1 | 2 | 1 | 2 | FALSE |
| 8 | alias | | 1 | 0 | 1 | 0 | 8 | 1 | FALSE |
| 9 | pop | delete top value | | 0 | 0 | 0 | 9 | — | FALSE |
| 10 | apply | | | 0 | 1 | 0 | 8 | 1 | FALSE |
| 11 | stack | | | 2 | 2 | 2 | 1 | 1 | FALSE |

Note in the above example and corresponding FIG. 9, the entire code graph, which is the sub-graph of node 11, is not self-contained as there exists a ghost node (node 1) within the sub-graph.

Figure 10:
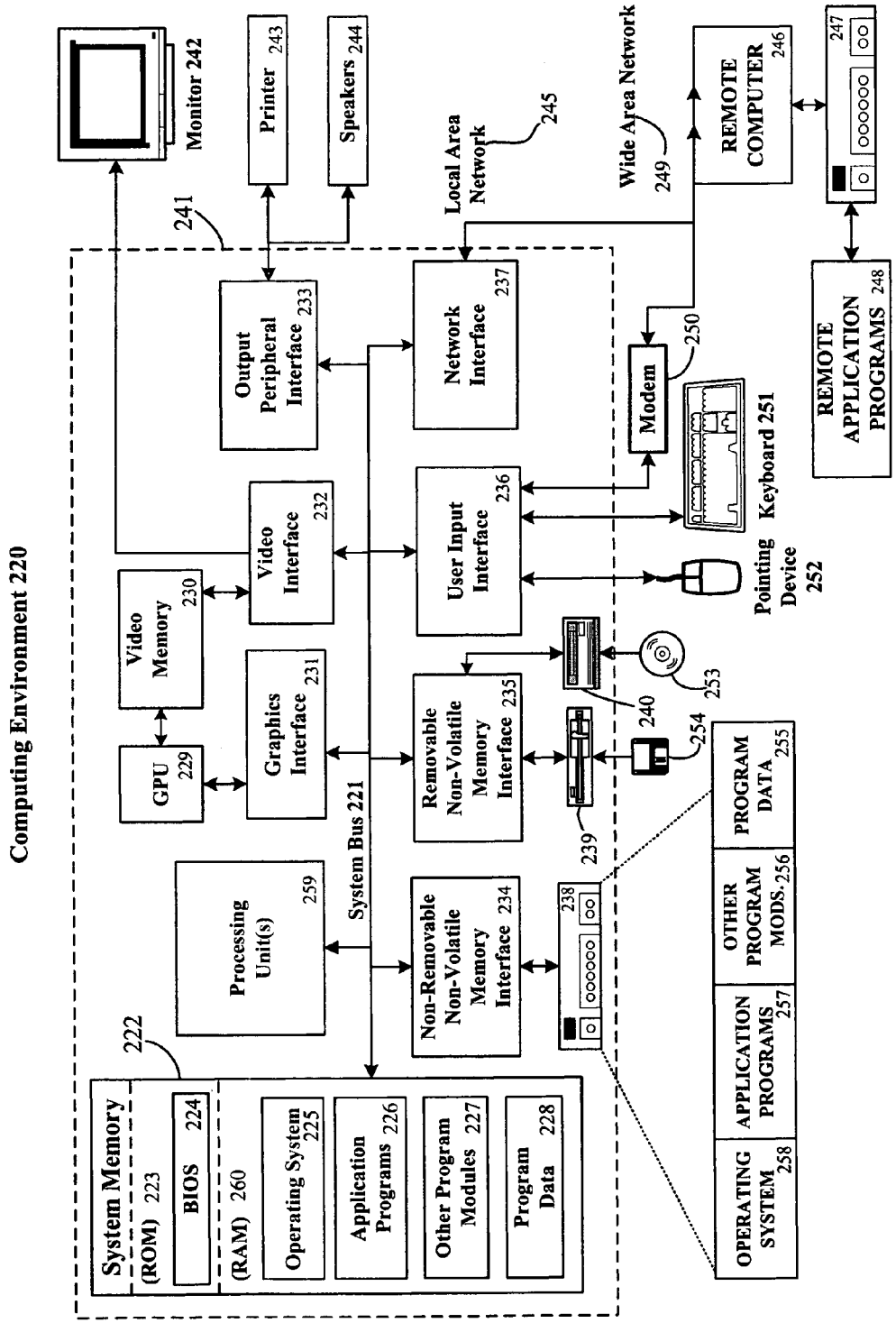
FIG. 10 is a block diagram representing an exemplary computing device suitable for use in conjunction with implementing the graphs, processes and systems of FIGS. 1-10 according to the present invention.

Referring next to FIG. 10, shown is a block diagram representing an exemplary computing device suitable for use in conjunction with implementing the processes described above and of FIGS. 1 through 10 regarding determination of independence of sub-graphs in a graph-based intermediate representation of program instructions. For example, the computer executable instructions that carry out the processes and methods for determination of independence of sub-graphs in a graph-based intermediate representation of program instructions may reside and/or be executed in such a computing environment as shown in FIG. 10. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 10 illustrates operating system 225, application programs 226, other program modules 227, and program data 228.

The computer 241 may also include other removable/non-removable, volatile/nonvolatile computer storage media. By way of example only, FIG. 10 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 10, provide storage of computer readable instructions, data structures, program modules and other data for the computer 241. In FIG. 10, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 10. The logical connections depicted in FIG. 10 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 10 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 10 and the further diversification that can occur in computing in a network environment such as that of FIG. 10, the systems and methods provided herein cannot be construed as limited in any way to a particular computing architecture. Instead, the invention should not be limited to any single embodiment, but rather should be construed in breadth and scope in accordance with the appended claims.

What is claimed is:

1. A computer-implemented method for optimizing the operation of sequences of computer program instructions executing within a computing system by determining independence of a sub-graph in a code graph, wherein the code graph is a graph-based representation of the sequences of computer program instructions and the sub-graph represents part of the computer program that would be affected by the certain rearrangement of sequences of instructions for optimization, comprising the steps of:

visiting a plurality of nodes in the code graph in post-order fashion; determining for a current node being visited whether a sub-graph of the current node has an alias node that refers to a target node, said target node being a node representing an argument which is the result of a previous program instruction;

determining whether the target node is outside of the sub-graph of the current node by determining a smallest post-order node number of all said target nodes of all alias nodes in the sub-graph of the current node, comparing said smallest post-order node number of all said target nodes to a smallest post-order node number overall in the sub-graph of the current node and indicating the target node is outside the sub-graph of the current node if said smallest post-order node number of all said target nodes is not greater than or equal to the smallest post-order node number overall in the sub-graph of the current node;

determining a total number of alias nodes in the sub-graph of the current node;

determining a total number of alias nodes generated as a result of program instructions represented in the sub-graph of the current node;

indicating that the sub-graph of the current node is not independent if the total number of alias nodes in the sub-graph does not equal the total number of alias nodes generated as a result of program instructions represented in the sub-graph; and indicating that the sub-graph is not independent if the target node is outside the sub-graph of the current node.

2. A computer readable storage medium having instructions thereon for performing the method of claim 1.

3. The method of claim 1 wherein the total number of alias nodes in the sub-graph and the total number of alias nodes generated as a result of program instructions represented in the sub-graph is tracked and stored during creation of the code graph.

4. A computer readable storage medium having instructions thereon for performing the method of claim 3.

5. A computer-implemented method for determining the independence of a sub-graph in a code graph, wherein the code graph is a graph-based representation of the sequences of computer program instructions executing within a computing system, the method comprising:

visiting a plurality of nodes in the code graph in post-order fashion;

determining for a current node being visited whether a sub-graph of the current node has an alias node that refers to a target node, said target node being a node representing an argument which is the result of a previous program instruction;

determining whether the target node is outside of the sub-graph of the current node;

indicating that the sub-graph is not independent if the target node is outside the sub-graph of the current node;

determining for the current node whether there is at least one node within the sub-graph of the current node that represents that a basic block corresponding to the program instructions represented by the code graph contains an instruction some or all of whose arguments are supplied from a different basic block not represented by the code graph;

indicating that the sub-graph of the current node is not independent if there is at least one such said node within the sub-graph of the current node;

determining a total number of alias nodes in the sub-graph of the current node;

determining a total number of alias nodes generated as a result of program instructions represented in the sub-graph of the current node;

and indicating that the sub-graph of the current node is not independent if the total number of alias nodes in the sub-graph does not equal the total number of alias nodes generated as a result of program instructions represented in the sub-graph.

6. A computer readable storage medium having instructions thereon for performing the method of claim 5.

7. The method of claim 5 wherein the total number of alias nodes in the sub-graph and the total number of alias nodes generated as a result of program instructions represented in the sub-graph is tracked and stored during creation of the code graph.

8. A computer readable storage medium having instructions thereon for performing the method of claim 7.

9. A system for determining the independence of a sub-graph in a code graph, wherein the code graph is a graph-based representation of the sequences of computer program instructions comprising:

means for visiting a plurality of nodes in the code graph in post-order fashion;

means for determining for a current node being visited whether a sub-graph of the current node has an alias node that refers to a target node, said target node being a node representing an argument which is the result of a previous program instruction;

means for determining whether the target node is outside of the sub-graph of the current node, comprising means for determining a smallest post-order node number of all said target nodes of all alias nodes in the sub-graph of the current node;

means for comparing said smallest post-order node number of all said target nodes to a smallest post-order node number overall in the sub-graph of the current node;

means for indicating the target node is outside the sub-graph of the current node if said smallest post-order node number of all said target nodes is not greater than or equal to the smallest post-order node number overall in the sub-graph of the current node;

means for determining for the current node whether there is at least one node within the sub-graph of the current node that represents that a basic block corresponding to the program instructions represented by the code graph contains an instruction some or all of whose arguments are supplied from a different basic block not represented by the code graph;

means for indicating that the sub-graph of the current node is not independent if there is at least one such said node within the sub-graph of the current node;

means for determining a total number of alias nodes in the sub-graph of the current node;

means for determining a total number of alias nodes generated as a result of program instructions represented in the sub-graph of the current node; and means for indicating that the sub-graph of the current node is not independent if the total number of alias nodes in the sub-graph does not equal the total number of alias nodes generated as a result of program instructions represented in the sub-graph.

10. The system of claim 9 wherein the total number of alias nodes in the sub-graph and the total number of alias nodes generated as a result of program instructions represented in the sub-graph is tracked and stored during creation of the code graph.

* * * * *